Sept. 26, 1950     J. PETSCHAUER     2,523,918
ELECTRIC TRACER CONTROL DEVICE FOR MACHINE TOOLS
Filed Sept. 14, 1948
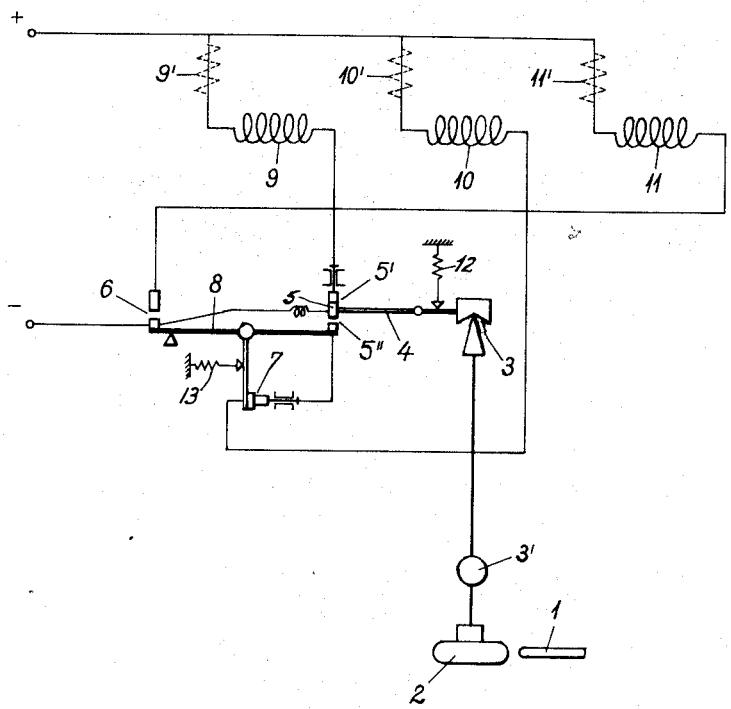
Inventor
Johann Petschauer.
By Henry W. Bock
Agt.

Patented Sept. 26, 1950

2,523,918

UNITED STATES PATENT OFFICE 2,523,918

ELECTRIC TRACER CONTROL DEVICE FOR MACHINE TOOLS

Johann Petschauer, Vienna, Austria, assignor to Maschinenfabrik Heid Aktiengesellschaft, Vienna, Austria, an Austrian joint-stock company Application September 14, 1948, Serial No. 49,283
In Germany April 17, 1944

6 Claims. (Cl. 175—335)

The invention relates to an electric tracer control device for machine tools, like planing machines, lathes and milling machines, especially planing machines with a short path of the tool from the end of one cutting operation to the beginning of the next cutting operation for treating crank cheeks, whereby by means of a swiveling tracer scanning a template switching contacts are engaged for controlling through magnetic clutches the electric motor drive for the delivery movements of the tool exactly corresponding to the template.

With the known control devices of this sort the operating circuit of the magnetic clutches is controlled through relays by the control circuit of the switching contacts. The scanning of the template ensues in two directions perpendicular to one another, so that stepped delivery movements of the tool do thereby result. The smaller or the more finely stepped the movements of the tool are, the greater naturally is the surface quality of the work piece to be treated. The height of steps of the delivery movements is essentially influenced by the switching periods of the relays, by the clutches, and by the motors. The shorter said switching periods are, the greater may be the frequency of the switching of the tracer, and the more precisely the work piece may be machined. Thus a limit is set for the frequency of the switching of the tracer, and therefore also for the height of steps of the delivery movements, whereby it is impossible to go below said limits with the control devices hitherto used. A further drawback is especially added by the non-uniformity of the control movements in consequence of relays which do not always uniformly respond.

In order to diminish these drawbacks it has been suggested to arrange additional regulating devices, e. g. a delivery device, for changing the extent of the delivery movement and for limiting the duration of the same, said regulating device comprising two additional relays, or an electric speed regulator for the motors actuating the delivery movements, said regulator being intended for adjusting the stepping to the grade of the curve to be copied, since the relation of the number of revolutions is the greater, the greater the inclination of the template to be scanned is. It goes without saying that by the use of additional arrangements for an electric control of this kind the drawbacks, which occur at any rate in consequence of these more complicated constructions, like diminished economy, increased possibilities of disturbances, have to be put up with, without the possibility, however, thereby to remedy the fundamental evil of a limited switching frequency of the tracer and thus of a limited surface quality of the work piece. It has, furthermore, been suggested to give up a control by means of clutches, and there have been instead proposed for use the by far more complicated differential gears, the differences of the speed of which result in the advance movement given, said gears requiring, moreover, extensive regulating means, like a motor-driven field regulator. Finally, it has been attempted to increase the precision of the work by eliminating the mechanic contacts actuated by the tracer. Another suggestion provides instead of the contacts so-called electro-magnetic gage heads effecting the control of the shifting motors by means of gas discharge relays. Despite the numerous attempts for solving the given problem it has not yet been possible to manufacture a simple and economical control mechanism of a great copying precision working clear of faults.

Before describing the nature of the invention the hitherto used control devices of this kind are to be more particularly considered, in order clearly to define the differences with regard to the latter. As has already been mentioned, there must, with the hitherto used control devices, be employed relays serving for coupling the operating current circuit of the clutches with the control current circuits of the switching contacts. Both separate current circuits are required, as the high coupling voltage is not suitable for actuating the switching contacts controlled by the tracer, because of the formation of sparks and the destruction of the contacts by burning. There has e. g. been employed a voltage of 14 v. for the contacts and of 110 v. for the coupling, whereby the coupling voltage has, in the usual way, been operated taking, at the same time, advantage of the electric voltage drop to a lower voltage in the coupling coil, e. g. 18 v., for shortening the starting period of the coupling. This construction having become common with magnetic clutches seemed, with the use of said clutches for tracer control devices, the more urgent, as for the switching periods of said clutches, as has been stated, the most effective shortening possible is desired and compelling in those cases, in which, as with regard to the treatment of crank cheeks, only a short interspace is at the disposal for the switching time, e. g. in cases, when the adjustment of the tool is to be carried out on a route of 6 to 7 mm. in a few hundredths of a second.

The present invention essentially consists in that with an electric tracer control device for machine tools—whereby switching contacts are actuated by means of a swiveling tracer scanning a template, said switching contacts controlling by means of magnetic clutches the drive for the delivery movements of the tool exactly corresponding to the template—the magnetic clutches are inserted in one electric current circuit with the switching contacts, without the intermediate insertion of relays, in order to attain a finely stepped scanning and an improvement of the surface quality of the work piece, said current circuit being supplied with a low voltage of mostly about 40 v., in order to avoid a formation of sparks effecting the burning of the switching contacts. Therefore, according to the invention, the relays and thus the responding periods required by said relays are omitted. Contrary to the conventional construction of the clutches it has been ascertained that, when using a lower voltage than was hitherto the case, e. g. of 20 v., indeed a longer responding period is required by the magnetic clutch, yet said period is still shorter than the hitherto required total switching period of clutch and relay. The magnetic clutch controlled in a manner according to the invention requires a switching period of about $3/100$ sec. as opposed to the hitherto required switching period of $4/100$ to $6/100$ sec., out of which the relays demand a switching period of $3/100$ to $5/100$ sec. The responding period of the clutch may, however, be decreased to about one half, if, according to the invention, the voltage drop, known per se, between the applied coupling voltage and the voltage applied on the magnetic coil of the clutch is applied to the magnetic coupling supplied by a low voltage, so that e. g. the applied voltage of the clutch amounts to 15 v. and the voltage of the magnetic coil to 8 v.

The tracer control device according to the invention thus mainly enables an increase of the switching speed and an improvement of the surface quality of the work piece. This effect may be increased still more by placing the tracer contacts closer to each other than when using relays, as by their omission delays during the closing or opening of the tracer contacts are eliminated. The work piece may therefore be machined more precisely, so that less or no finishing work is required. With milling machines with a short interspace between successive cutting operations the control device according to the invention is, as has been mentioned compulsory, in order to carry out the delivery movements of the tool during the short switching period which is at the disposal. However, the advantages of the invention do even exceed the advantages described above, and in fact, as regards machine tools of any kind, because an improvement of the surface quality, a great economy and a higher degree of freedom from disturbances are attained. The omission of the relays results, apart from the advantages mentioned, not only in the disappearance of the sources of disturbances, but also a decrease of the production costs and of the operating expenses of the simplified machine working under only one voltage.

The switching scheme of a machine tool according to the invention from the tracer to the magnetic clutches is shown, by way of example, in the drawing.

The template 1 is scanned by a scanning roll 2 connected to a tracer 3 turnable about the pivot 3' in all directions and controlling, by means of a two-armed spring loaded lever 4 with one end urged by a spring 12 toward the tracer and having at the other end a two-sided contact 5, the tracer contact lever 8 with the switching contacts 5'', 6, 7. By the numerals 9, 10, and 11 are denoted the magnetic coils of the magnetic clutches the latter controlling the movement of the tool in the direction from and to the work piece, as well as in the longitudinal direction. One end of coil 9 is connected with a contact 5' capable of a limited motion and engageable by one side of the contact 5 and movable therewith within those limits. After a predetermined swing of lever 4 and contact 5 but prior to contact 5' reaching its limit remote from coil 9, the other side of contact 5 is engaged by contact 5''. When contact 5' reaches that limit of its motion, it becomes disengaged from contact 5.

Contact 7 on lever 8 is urged by a spring 13 toward a mating contact resembling contact 5' in that it has a limited motion with contact 7 against spring 13 and which is connected to contact 5''.

Contact 6 on lever 8 is urged by spring 13 away from its mating contact connected to coil 11.

The voltage applied to the contacts 5, 6, 7 and to the couplings 9, 10 and 11 amounts to e. g. 15 v. There may, however, also be applied a higher voltage up to the given limit, whereby possibly a condenser may be switched parallel to the contacts in known manner. For shortening the switching period of the couplings an ohmic resistance 9', 10', or 11' (marked by dotted lines) may be connected in a series to the clutch coils, so that e. g. a voltage of 8 v. is applied.

The mode of operation of the tracer control device is as follows: If the scanning roll 2 does not touch the template 1, there is, corresponding to the contact position illustrated, switched on the movement of the tool towards the center of the work piece through the magnetic coupling 9, and thus also the scanning roll is moved towards the template. According to the swinging out of the tracer and thus of the tracer lever 4 controlled by the template the following contact positions may successively ensue: The position already mentioned with the contact 5' and one side of contact 5 closed, then the position in which the contacts 5' and one side of contact 5 remains engaged, 5'' engages the other side of contact 5 and 7 is engaged with its mate, thereupon the position in which 5'' and 7 are closed as in the previous or second position, furthermore the position in which 5'', 7 are closed as in the previous or third position and 6 and its mate are closed, and finally the position in which 5'' and 6 are closed. The remaining contacts not mentioned are open. These contact positions correspond to five different directions of movement, and are, according to the order of the contact positions stated, the following: movement to the work piece; movement resulting from the movement to the work piece and from the longitudinal movement; longitudinal movement; movement resulting from the longitudinal movement and the movement off the work piece; movement off the work piece. According to the shape of the template the tracer remains for a time in one of the five positions described so long, until the shape of the template moves the tracer into another position.

While the invention has been shown in the particular embodiment described it is not limited thereto, as modifications thereof may be made

I claim:

1. Electric tracer control device for machine tools comprising a tracer swivelly mounted for scanning a template, means movably mounted and controlled by said tracer and carrying contacts, other contacts each engageable by one of the first contacts in predetermined sequence, electro-magnetic clutch coils for controlling the delivery movements of a tool, each at one end connected to one of the other contacts, a source of current connected to the other ends of the coils and certain contacts of the movable means.

2. Electric tracer control device for machine tools comprising a tracer swivelly mounted for scanning a template, a member movably mounted and controlled by said tracer and carrying contact means, another member movably mounted and carrying contact means, certain contact means of the other member being engageable by the contact means of the first member thereby moving the second member, a plurality of other contacts each engageable in succession with one of the contacts of said members, certain of the other contacts being movable within predetermined limits to disengage each of said certain other contacts from a contact of the members, electro-magnetic clutch coils and each connected to one of the other contacts, each coil being adapted to control a certain movement of the tool, a source of current connected to said coils and the contact of the first member and certain other contacts of the second member and supplying current of low voltage up to about 40 volts.

3. Electric tracer control device for machine tools as claimed in claim 2, wherein ohmic resistances are connected between the coils and the electric current source.

4. Electric tracer control device for machine tools, comprising a tracer swivelly mounted for scanning a template, a contact member movably mounted urged to a first position and movable therefrom by the tracer successively to a second and third position, a contact engageable with the first contact member in the first and second positions, an electro-magnetic clutch coil connected at one end to the contact, a second movable contact member having three contacts and urged to a first position holding its first contact facing, but spaced from the contact of the first member when in its first position, the first contact of the second member being engageable with the contact of the first member in the second position thereof, the second member being movable by the engagement of the contact of the first member with the first contact of the second member to a second and third position, a second contact electrically connected to the first contact of the second member, the second contact of the second member in the first and second position thereof being engageable with the second contact, a second electro-magnetic clutch coil connected at one end to the second contact of the second member, a third contact engageable with the third contact of the second member in the second and third position thereof, a third electro-magnetic clutch coil connected at one end to the third contact, a supply conductor connected to the other ends of the coils, and a return conductor connected to the third contact of the second member and contact of the first member, the current supplied through said supply and return conductors being of low voltage up to about 40 volts.

5. Electric tracer control device for machine tools as claimed in claim 4, wherein the contact members are levers and the first and second contacts are movable to a limited extent.

6. The electric control device for machine tools according to claim 4 and wherein the contact of the first member in the first position thereof engages the first contact with one side and the first contact of the second member in the second position of the first member engages with the other side of the first contact of the first member.

JOHANN PETSCHAUER.

REFERENCES CITED

The following references are of record in the file of this patent:

UNITED STATES PATENTS

| Number | Name | Date |
| --- | --- | --- |
| 1,314,617 | Tiffany | Sept. 2, 1919 |
| 1,874,383 | Lanner | Aug. 30, 1932 |
| 2,007,899 | Shaw et al. | July 9, 1935 |
| 2,201,118 | Beebe | May 14, 1940 |
| 2,334,956 | Ridgway | Nov. 23, 1943 |